United States Patent [19]

Gallup

[11] Patent Number: 5,665,242
[45] Date of Patent: Sep. 9, 1997

[54] INHIBITION OF SILICA PRECIPITATION

[75] Inventor: Darrell L. Gallup, Santa Rosa, Calif.

[73] Assignee: Union Oil Company of California, El Segundo, Calif.

[21] Appl. No.: 519,668

[22] Filed: Aug. 25, 1995

[51] Int. Cl.$^6$ ........................................ C02F 5/08
[52] U.S. Cl. .................. 210/696; 60/641.2; 60/641.5; 210/743; 210/747; 422/12
[58] Field of Search ........................ 60/641.2, 641.5; 210/696–701, 747, 743; 422/12

[56] References Cited

U.S. PATENT DOCUMENTS

| | | | |
|---|---|---|---|
| 4,420,399 | 12/1983 | Redmore | 210/700 |
| 4,479,543 | 10/1984 | Kalfayan et al. | 166/300 |
| 4,500,434 | 2/1985 | Jost et al. | 210/696 |
| 4,584,104 | 4/1986 | Dubin | 210/696 |
| 5,073,270 | 12/1991 | Gallup et al. | 210/698 |
| 5,190,664 | 3/1993 | Gallup et al. | 210/696 |

*Primary Examiner*—Peter A. Hruskoci
*Attorney, Agent, or Firm*—Gregory F. Wirzbicki; Alan H. Thompson

[57] ABSTRACT

A method for controlling fouling of a flashing vessel or heat-exchange surface exposed to a high-enthalpy geothermal brine tending to form silicon-containing scale. The method adds a silicon-complexing amount of fluoroborate species to the brine to form a fluid mixture that does not produce substantial amounts of the scale when the temperature of the fluid mixture is reduced. The addition does not significantly increase corrosion rates of mild steel heat-exchanger materials of construction.

37 Claims, 2 Drawing Sheets

INHIBITION OF SILICA PRECIPITATION

FIELD OF THE INVENTION

This invention relates to the treatment of a hot aqueous brine solution from a geothermal reservoir. The brine contains various dissolved components which may have scaling and corrosive tendencies. More particularly, the invention relates to a treatment of a high-enthalpy geothermal brine generally having more than a saturated concentration of ions that will produce a precipitate, and from which brine heat is transferred across a solid surface, cooling the brine. The cooled brine is then typically injected back into the geothermal reservoir.

BACKGROUND

General processes by which geothermal brine can be used to generate electric power have, of course, been known for some time. Geothermal brine from a producing well, having a wellhead temperature of over about 180° C. and a wellhead pressure of over about 400 psig, for example, can be flashed to a reduced pressure to convert some of the water or brine into steam. Steam produced in this manner is generally used in conventional steam turbine-type power generators to generate electricity.

Cooler, less pressurized, geothermal brine can be used in closed-loop, binary fluid system in which a low-boiling point, secondary liquid (such as hydrocarbon) is vaporized by the hot brine. The vapor produced from the secondary liquid is then used in a gas turbine-generator to generate electricity. The vapor from the turbine is recondensed and reused.

In both instances, the "used" geothermal brine liquid is most commonly reinjected into the ground into a "reinjection well" to replenish the aquifer from which it was extracted and to prevent ground subsidence. Reinjection of geothermal brine into the reinjection well is also important to avoid the problems associated with the disposal of large amounts of saline and/or highly-contaminated and nearly saturated brine.

It is generally known that the solubility of most dissolved ions in geothermal brine decreases with a decrease in brine temperature. If dissolved ions are present near their saturation concentration in the brine, a significant reduction in the temperature of the system can result in supersaturation and precipitation of a portion of these supersaturated ions. Precipitates can combine and deposit as a scale on any solid surface with which they come into contact, such as the vessel or conduit in which the brine is confined.

As discussed by Bowen and Groh ("Energy Technology Handbook," D. M. Considine, Editor, at page 7–4 of Chapter 7 entitled "Geothermal Energy"), liquid-dominated geothermal brine reservoirs may be conveniently divided into two types: one type having high-enthalpy fluids above 200 calories/gram; and one having low-enthalpy fluids below this point. High temperature type brines (i.e., high-enthalpy brines) have been defined by in-situ reservoir temperatures, the high temperature type having in-situ temperatures generally above 180° C., typically above 200° C., most commonly above 220° C., whereas the low temperature type (i.e., low-enthalpy brines) have temperatures below these values. The high-enthalpy brines especially tend to dissolve reservoir rock or contacting solids and these brine types contain dissolved solids (and ions) in concentrations ranging from around 2,000 to as much as 260,000 ppm by weight.

An especially troublesome dissolved solid component of the high-enthalpy brine is silicon, which may be found at or near saturation concentrations in the form of oligomers or polymers of silicic acid. Such species tend to precipitate out of the brine at almost every stage of brine processing as the temperature is lowered, for example, as substantially pure silica, as a tightly adherent metal-silica/metal-silicate scale, or as other solidified silicon-containing components. Unless inhibited, naturally occurring silica-rich scale/precipitation (as the brine is cooled) must be removed frequently. The precipitation tendency (and the consequent need to remove precipitate) increases as lower brine temperatures are reached during the cooling process.

During the extraction of the thermal energy from a liquid geothermal brine, the brine temperature is reduced. Heat-exchangers are commonly used for low-enthalpy brine applications, such as those for producing hot water. The brine's thermal energy is transferred within the heat-exchangers to the hot water. The heated water may in turn heat air (for space heating) or other fluids such as hydrocarbons (in a binary fluid system). Even though the low enthalpy brines may be saturated with dissolved solids, the limited amount of temperature reduction possible for these low-enthalpy (i.e., moderate temperature) brines produces little or no precipitation and fouling of heat-exchange surfaces, or plugging of injection wells. This lack of significant precipitation or fouling is also believed due to the relative stability of slightly supersaturated brines. Even if the supersaturated brine is not stable, the low precipitation rates (i.e., slow precipitation kinetics) at the moderate brine temperatures within these heat-exchangers are also believed to inhibit large amounts of precipitation and fouling.

However, high-enthalpy or high temperature brines typically have larger saturation concentrations of dissolved solids and faster precipitation kinetics. The removal of larger amounts of heat can also produce significant levels of supersaturation. High-enthalpy brines therefore tend to produce copious quantities of scale which can plug conduits, injection wells, the subterranean formation in the vicinity of the immediate injection wells (up to about 50 feet from the wellbore), and quickly foul a conventional heat-exchanger. Normally, conventional heat-exchangers are not generally employed for high-enthalpy brines, even though extraction of heat from such brines using a heat-exchanger process may otherwise be beneficial.

Because of such conventional heat-exchanger fouling, a condensing flash-method for extracting energy from high-enthalpy brines is commonly used upstream of the heat-exchanger. Flashing is accomplished in a vessel where brine pressure is reduced. As a result, a portion of the brine is flashed to steam and other gases while the temperature of the residual brine is decreased and separated from the steam. Flashing is often accompanied by massive amounts of precipitation formation that may scale and eventually plug piping. Other processes which avoid a fouled heat transfer surface, such as total flow and direct-contact (fluid-to-fluid) heat-exchange processes, have also been proposed for high-enthalpy brines.

Because of massive scaling, various proposals have been made to decrease the scale formation in flash-condensing or other non-heat-exchange surface equipment used in producing and handling high-enthalpy geothermal brines. In "Field Evaluation of Scale Control Methods: Acidification," by J. Z. Grens et al, Lawrence Livermore Laboratory, Geothermal Resources Council, Transactions, Vol. 1, May 1977, there is described an investigation of the scaling of turbine components wherein a geothermal brine at a pressure of 220 to 320 p.s.i.g. and a temperature of 200° to 230° C. (392° to 446° F.) was expanded through nozzles and impinged against static wearblades to a pressure of 1 atmosphere and a temperature of 102° C. (215° F.). In the nozzles, the primary scale was heavy metal sulfides, such as lead sulfide, copper-iron sulfide, zinc sulfide and cuprous sulfide. Thin basal layers of fine-grained, iron-rich amorphous silica appeared to promote the adherence of the primary scale to the metal substrate. By contrast, the scale formed on the wearblades was cuprous sulfide, native silver and lead sulfide in an iron-rich amorphous silica matrix. When the brine which originally had a pH of 5.4 to 5.8 was acidified with sufficient hydrochloric acid to reduce the pH of the expanded brine to values between 1.5 to 5.0, scaling was dramatically reduced or eliminated.

However, such acidification, especially at a pH near 1.5, tends to significantly increase the corrosion of the brine-handling equipment. If a downstream heat-exchanger were to be used to handle strongly acidified brines, added wall thickness or excessively costly materials of construction would be required. If added wall thickness heat-exchangers are used, frequent removal of corrosion products from the heat-exchange surfaces may also be required.

Strong acid treatments can also cause other geothermal fluid handling problems, such as the introduction of oxygen into an otherwise oxygen-free brine, the embrittlement of equipment, and the problems associated with reinjection into a subterranean formation. Common commercial acid treatments of geothermal brines have often been limited to relatively small changes in pH such as those treatments disclosed in my U.S. Pat. Nos. 4,500,434, and 5,190,664, the disclosures of which are incorporated by reference herein in their entireties. In U.S. Pat. No. 4,500,434, the moderately acidified brine was flashed in a series of separators and the formation of insoluble silicon components in the brine (and on the solid container surfaces) was substantially inhibited until disposal of the brine. In U.S. Pat. No. 5,190,664, a limited amount of sulfuric acid was added to a high-enthalpy brine prior to the brine passing through the mild steel heat-exchanger and silica scaling was virtually eliminated while corrosion rates were not significantly increased. These treatments accept a residual amount (not the complete elimination) of scale, especially silica, deposited on flash process or heat-exchange equipment in return for acceptable corrosion rates and significant reductions in scaling rates. Reducing scale formation decreases the amount of scale removal, but deposits can still quickly foul solid surfaces making such flash and/or heat-exchange processes impractical without very frequent cleaning—which may, in turn, result in partial or complete shut down of the process, i.e., shorten the process cycle life.

While the aforementioned acidified geothermal brine and modified acidified brine treatments have met with some success in some heat-exchanger and flash-separator (i.e., condensing-flash) surface applications, the need exists for a further improved treating process that further decreases fouling due to scaling by silicon-containing solids. Controlling fouling tendencies in materials commonly used in heat-exchangers or flash-separators, without significant added cost, would allow economic energy extraction from some high-enthalpy brines. The economic advantages of being able to extract energy in a condensing-flash process is beneficial when high-enthalpy brines contain precipitable components in near saturation amounts, but is especially beneficial in a heat-exchange process when the high-enthalpy brines contain high dissolved gas contents, thus avoiding the need for costly non-condensable gas removal equipment normally required for a condensing-flash process.

Accordingly, this invention provides an improved method for decreasing or essentially eliminating the overall precipitation and scaling of these brines, particularly silica and aluminum-silicate and/or iron-silicate scale, so as to prevent significant fouling of condensing-flash surfaces or heat-exchanger surfaces. It is also desirable to control corrosion of such surfaces when they are composed of commonly used materials of construction, such as low carbon steels.

SUMMARY OF THE INVENTION

Briefly, the present invention provides a method for decreasing or essentially eliminating the fouling of surfaces of geothermal industrial processing equipment caused by the deposition of iron-silicate or aluminum-silicate and/or other silicon-containing scales from a high-enthalpy or high temperature geothermal brine generally having more than a saturated concentration of ions capable of producing a silicon-containing precipitate. It has been discovered that a brine-soluble fluoroborate species can be added to such geothermal brines in amounts sufficient to essentially eliminate silicon-containing scales. Such a fluoroborate species, more specifically a species containing tetrafluoroborate ion, only slightly lowers, if at all, the pH of the brine so that corrosion rates are not significantly increased. In general, any source of hydrogen fluoride (such as a brine-soluble fluoride species) can be combined with (or substituted for) the fluoroborate species to reduce scaling. This reduction or elimination of scaling, together with no significant increase in corrosion, allows low carbon steel flash vessels or heat-exchangers to be used for normal process cycle life (typically up to about 2 years). This cost-minimizing method essentially eliminates the formation of silicon-containing scale (i.e., silicas and/or metal silicates) in these brines without inordinate amounts of other additives.

In a preferred embodiment of the present invention, the high-enthalpy geothermal brine feed to a heat-exchanger (in a binary energy extraction process) generally contains more than saturated concentrations of iron, aluminum, calcium, barium, and/or other cations capable of reacting with silicic acid, oligomers of silicic acid and/or polymers of silicic acid, and the brine is preferably at a pressure sufficient to maintain the brine as a liquid, e.g., above typical separator or flash pressures. In addition to a significant concentration of trivalent metal ions (especially those of iron, aluminum and manganese) and silica species dissolved or suspended therein, the brine also typically contains dissolved non-condensable gases. Maintaining brine pressure during thermal energy extraction will also retain the dissolved gases. The brine is mixed with a water-soluble source of tetrafluoroborate ions, in amounts sufficient to maintain silicon levels in the brine to that which will not significantly exceed saturation levels of precipitated silicon-containing compounds, while lowering the pH of a feed brine to not less than about 4.0 at the binary process temperatures and pressures. Optionally, an acid is typically added in an amount sufficient to lower the pH of the brine mixture to within the pH range from about 4.0 to about 6.0, but preferably between 4.5 and 5.5.

BRIEF DESCRIPTION OF THE DRAWINGS

The present invention will be more readily understood by reference to the drawing of FIG. 1 which depicts, in simplified form, relevant portions of an exemplary geothermal brine production well and power plant with which the fluoroborate modification method of the present invention may be used to advantage.

DETAILED DESCRIPTION OF THE INVENTION

Prior geothermal brine processing has chosen to extract energy from high-enthalpy geothermal brines by passing them through industrial equipment such as a flash vessel or to a heat-exchanger. The primary reason for avoiding the extraction of heat in such industrial equipment is the very rapid precipitation of dissolved silicon-containing brine components and the subsequent fouling of the surfaces of the processing equipment. Even when precipitation is somewhat inhibited by prior art methods, the uneconomical removal of the remaining precipitation or of the relatively expensive construction materials is required.

Particularly in the case of heat-exchangers used in processing geothermal fluids, the present invention aims to overcome this problem by providing a process for passing the high-enthalpy brines through heat-exchangers with substantially decreased fouling—and thus gain the advantage that heat-exchange processes have over flashing operations for some brines. In particular, for high-enthalpy brines having high non-condensable gas contents, all other things being equal, a heat-exchange process has significant advantages over a flash process, such as avoiding removal of flashed non-condensable gases from flashed steam or condensate. Avoiding flashing of non-condensable gases such as $H_2S$ may also avoid severe corrosion and environmental abatement costs.

In producing and utilizing hot pressurized aqueous brine solutions, which liquid solutions contain dissolved metal salts (particularly silicon-containing salts) at or near their saturation concentration, in a manner so that the pressure and/or temperature is reduced, a portion of the metal salts can precipitate and deposit as scale on the surfaces of the vessel or conduit confining the brine. Examples of such hot pressurized aqueous brine solutions include geothermal fluids containing brine and steam, geothermal aqueous brines, and other brines used in a wide variety of industrial operations. Highly specific examples of silicon-containing, high-enthalpy brines are found in Bulalo and Tiwi, in the Philippines. A number of different types of scale can form depending on the nature and concentration of the ions and/or metal salts in solution. Many of these scales are soluble in an acid solution. However, due to the high temperature of the brine, e.g., 120° to 275° C., particularly high-enthalpy brines, and the fact that the confining vessels and conduits are generally of an iron metal, the addition of acid into the system results in severe corrosion of the metals. While corrosion inhibitors are known for most acids, these inhibitors do not function well under the severe temperature conditions of many systems. Thus, the use of acid to dissolve such scale has been limited and most often confined to systems employing corrosion resistant, but expensive, metals rather than the iron metals found in most industrial equipment.

It has now been found that scale formation from brine can be reduced, and scale previously formed can be removed, by including in the brine a fluoroborate species in an amount sufficient to inhibit formation of substantial amounts of silicon-containing precipitates, and optionally, to also lower the pH of the brine. "Substantial" amounts of precipitates deposited on the surface of the industrial geothermal processing equipment are typically those amounts which foul the equipment, causing shut down of all or part of the process within 750 days. Substantial amounts of silicon-containing precipitates formed in the brine-flowing sections of the processing equipment shorten the process cycle life of an otherwise comparable process not containing the fluoroborate additive. Preferably, both acid and fluoroborate species are added to the brine. Either inorganic mineral acids or organic carboxylic acids may be utilized. While some corrosion of the iron metal components occurs upon the addition of even small amounts of acid with the fluoroborate species, the industrial operation can be carried out for an appreciable length of time without scale problems before the iron metal components are corroded to the point that they must be replaced or repaired.

The scale forming, silicon-containing precipitates that foul industrial geothermal processing equipment are typically derived from the silicon-containing components of the geothermal fluid or geothermal brine, such components usually including silicic acid, polymers of monomeric silicic acid, oligomers of silicic acid, and silicates. The silicon-containing components of the geothermal fluid can form precipitable metal silicates and/or precipitable polymers containing crystalline and/or amorphous silicas. In the present invention, it is desirable to inhibit silica polymerization and metal silicate formation (particularly crystalline and amorphous silicas, and aluminum-, magnesium- and iron-silicates) by complexing the silicon-containing components of the brine.

It has now been found in the practice of this invention that a reaction product of a boron compound, such as boric acid, and a fluoride, is an effective complexing agent (even more so than fluoride ions alone), particularly at a pH above 4.0, and often at a pH above 5 or even above 6, for the dissolution of silicon-containing components of the geothermal brine solutions, and the corresponding inhibition of silicon-containing scales. The silicon(component)-complexing species is believed to be a complex of boron and fluorine, specifically a fluoroborate, more specifically the tetrafluoroborate ion, $BF_4^-$. It is also believed that the tetrafluoroborate ion is in equilibrium in acid solution with another fluoroborate species, $BF_3OH^-$, which can be formed by hydrolysis of tetrafluoroborate ion, and such species may also have silicon-complexing activity in the silicon-containing components of the brine. Other species comprising boron and fluorine may also exist in the brine solution (at process conditions), such as large complexes comprising tetrafluoroborate or species existing in equilibrium with tetrafluoroborate. As used herein, the term "fluoroborate" means tetrafluoroborate, $BF_3OH^-$ and any species in solution comprising boron and fluorine which comprises or is in equilibrium with tetrafluoroborate ions or $BF_3OH^-$.

For the purpose of maintaining silicon-containing components in liquid brine solution, sufficient boron compound is used to provide at least about 0.1 mole of boron per 4 moles of fluoride present in the brine, and preferably at least about 0.5 mole of boron per 4 moles of fluorine. More preferably, sufficient boron compound is included to provide at least about 1 mole of boron for every 4 moles of fluorine present. In the embodiment most preferred at present, at least about 2 moles of boron are provided for every 4 moles of fluorine. Ratios of boron to fluorine as high as about 8 moles B per 4 moles F, preferably no more than about 4 moles B per 4 moles F, can be used beneficially. Even lower and higher ratios of boron to fluorine can be used; but higher ratios offer little added benefit, and lower ratios can dissolve less of the silicon-containing components in the brine resulting in an increased amount of precipitate. In accordance with the present invention, a substantial portion, e.g., at least about 10 weight percent, preferably at least about 25 percent, and more preferably at least about 50 percent, of the silicon-containing components in the aqueous liquid or brine mixture is maintained in solution under the prevailing conditions of the particular geothermal process. The fluoride content thereof is converted to the soluble species $BF_4^{31}$ and, it is believed, the equilibrium species $BF_3OH^-$; and the silicon-containing components are solubilized at the same time.

Any boron compound that reacts with fluoride in acid to form tetrafluoroborate ion can be used in the practice of this invention. Examples of suitable boron compounds include boric acid and borates soluble in the brine solution, preferably alkali metal borates such as potassium borate and sodium borate (borax), as well as ammonium borate. In the acidic solutions used in the process of this invention, borates added to the brine solution react to form boric acid in the solution. When the borates are used, additional acid is ordinarily needed to react with the borate. Thus, boric acid itself is a preferred boron compound for use in the process of the invention. However, a highly preferred embodiment of the present invention involves the simple addition of water-soluble tetrafluoroborate salts such as sodium, potassium and ammonium tetrafluoroborate to the liquid brines treated in the industrial geothermal processing operations.

The process of the present invention can also be practiced to reduce scale formation by including in the brine any brine-soluble source of hydrogen fluoride, HF, or a brine-soluble fluoride compound, in place of, or in combination with the fluoroborate species. Examples of brine-soluble fluorides include fluorides of sodium, potassium, ammonium, magnesium, lithium, and the like. A preferred compound is ammonium hydrogen difluoride, $NH_4HF_2$. Reference herein to fluoroborate addition to the brine can mean, alternatively, the addition of a brine-soluble source of HF or fluoride.

Figure 1:
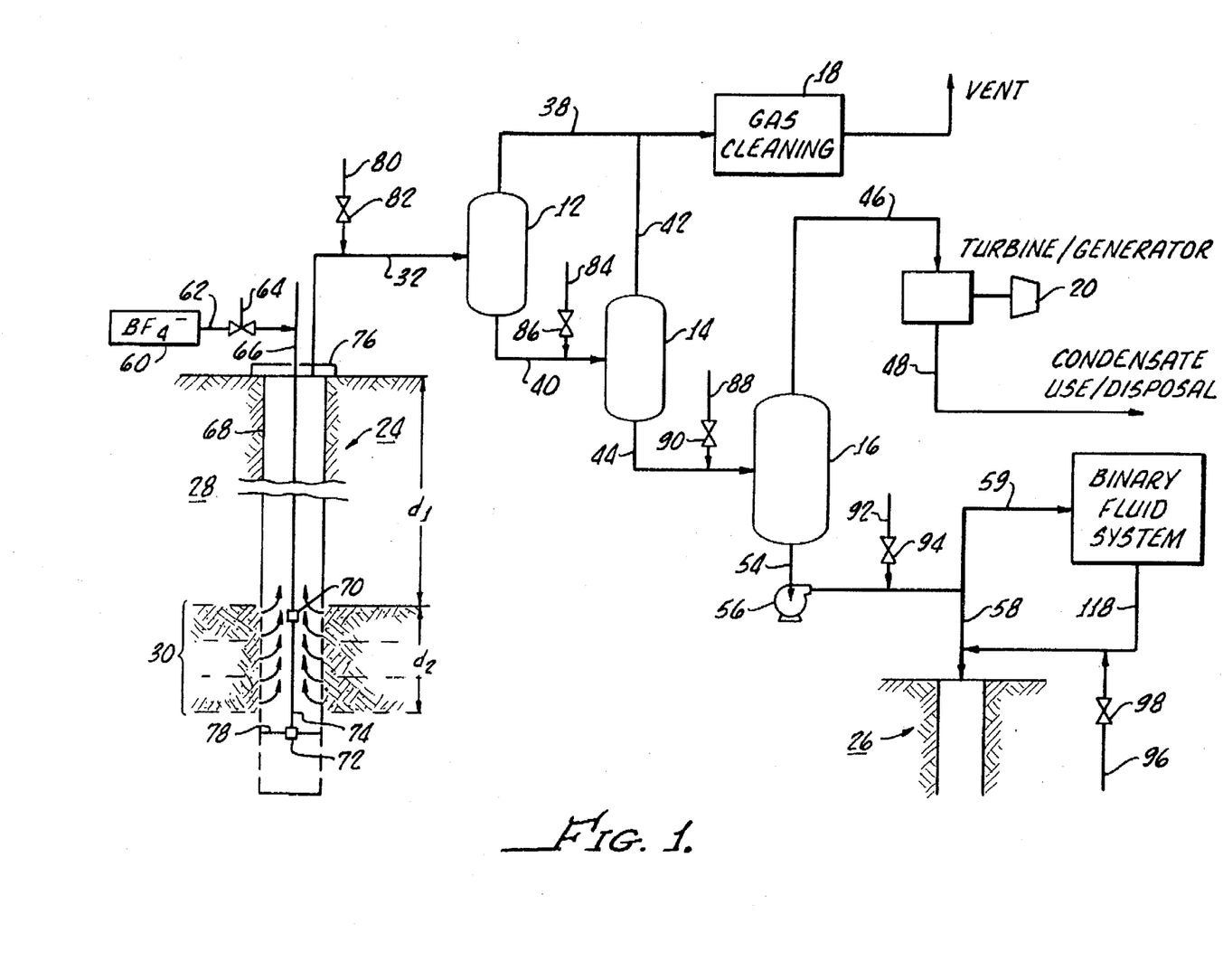

Shown in simplified form in FIG. 1 are relevant portions of an exemplary industrial geothermal processing operation involving a brine power plant 10. Comprising generally power plant 10 are first wellhead separator 12, second wellhead separator 14 and flash vessel 16. Shown included in power plant 10 are gas cleaning means 18 and steam turbine/generator 20. Associated with power plant 10, but not actually forming a part thereof, are brine extraction well 24 and brine reinjection well 26. Extraction well 24 penetrates into earth 28 a depth "$d_1$" to brine producing formation 30 which has a thickness "$d_2$". Ordinarily, reinjection well 26 is similar to extraction well 24 and may penetrate to the same producing formation 30.

In operation, hot geothermal brine is introduced under pressure from extraction well 24 through conduit 32 into the side region of first separator 12. Within separator 12 non-condensable gases including hydrogen sulfide, carbon dioxide and ammonia, are stripped from the geothermal brine. These non-condensable gases are discharged from the top of separator 12 through gas conduit 38 into gas cleaning means 18. The brine is discharged from the bottom of separator 12 and is directed through conduit 40 into the side region of second separator 14, in which remaining amounts of non-condensable gases are stripped from the brine. These remaining gases are discharged from the top of separator 14 through gas conduit 42 into conduit 38, to be directed thereby into gas cleaning means 18. Included in gas cleaning means 18 may be heat-exchangers (such as that shown in FIG. 2 as well as others) which enable heat to be extracted from the hot non-condensable gases to create additional energy (such as steam from steam condensate) in a manner known to those skilled in the art.

Figure 2:
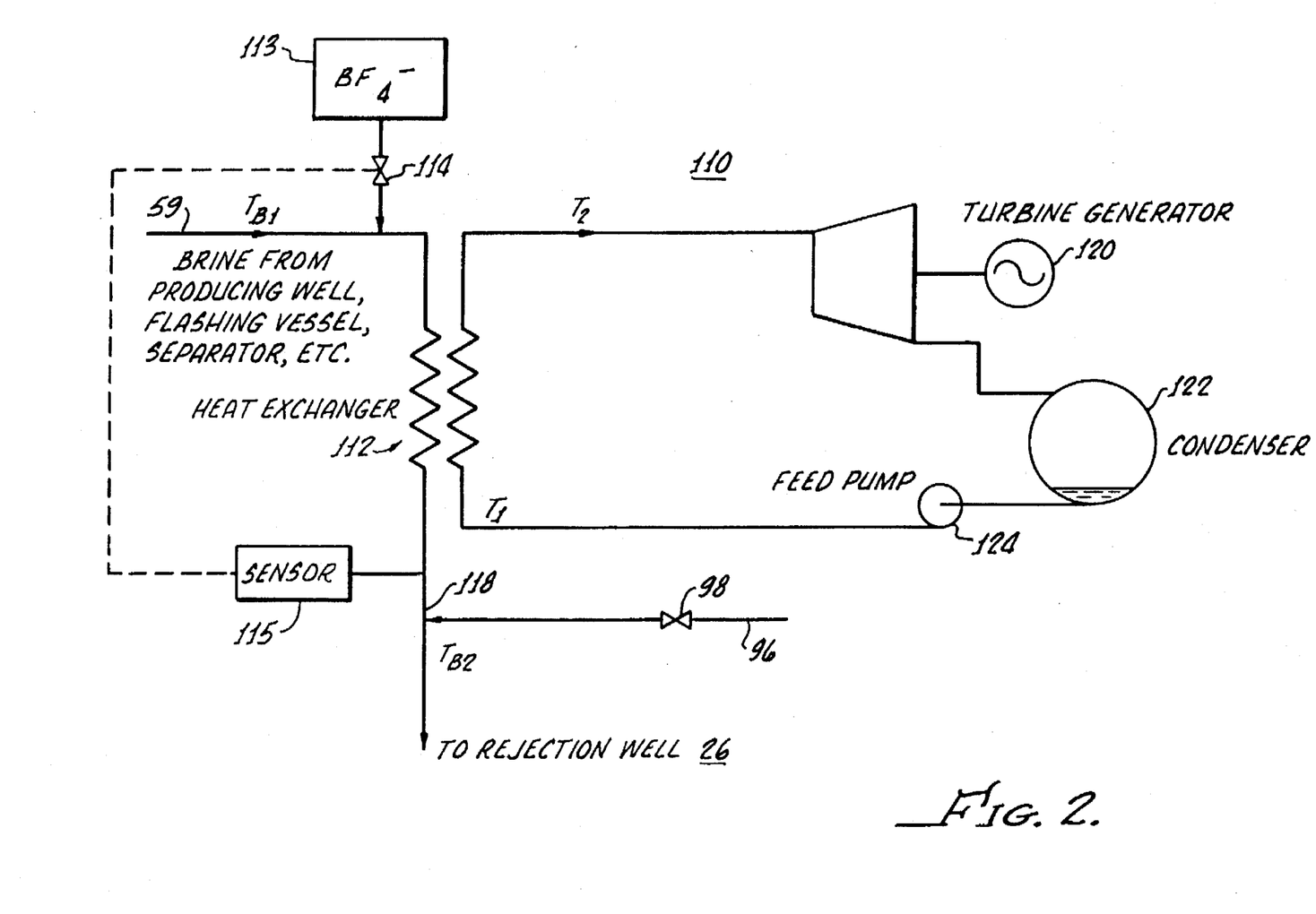
FIG. 2 shows a schematic of a geothermal binary process with fouling control fluoroborate addition.

From separator 14, the brine is discharged through conduit 44 into flashing vessel 16. Within flashing vessel 16, the brine is flashed to a substantially lower pressure, such as 125 pounds per square inch gauge (p.s.i.g.), so as to release steam, the released steam being routed from vessel 16 through conduit 46 to steam turbine/generator 20. Condensate and/or steam is discharged from turbine/generator 20 through conduit 48 for disposal or for routing to heat-exchanger portions of gas cleaning means 18. Flashed brine is discharged from flashing vessel 16 through conduit 54 to pump 56 which pumps the brine through conduit 58 into reinjection well 26. Alternatively, pump 56 may pump the brine to other means of disposal or to other uses (not shown in FIG. 1). However, it is specifically contemplated in the present invention to pass the brine through conduit 58 to a geothermal heat-exchanger to extract additional thermal energy from the brine, such as by utilizing a binary fluid system as depicted in FIG. 2 described hereinafter.

Effective pH of the brine as it enters well 24 from producing formation 30 is believed typically to be about 4 to about 7 and usually between about 5 and 6; however, due to removal of the non-condensable gases, the pH of the brine typically increases to between about 5 and 8 by the time it enters flashing vessel 16. Ordinarily as the brine enters well 24 from formation 30 flashing occurs to an extent causing release of about 1 to 1.5 percent of the steam contained in the brine, and by the time the brine reaches the top of well 24, additional flashing usually has occurred to an extent that between about 10 and 20 percent of the steam has been released. Brine temperature at producing formation 30 varies considerably from well to well, but is usually in the broad range from about 120° to 325° C., with brine temperature between about 220° and 275° F. being typical of many localities.

According to the present invention a fluoroborate species (and optionally, an acid) is introduced from source 60, through conduit 62 containing valve 64 into conduit 66 which extends down well 24, inside of well casing 68, terminating in nozzle 70 positioned approximately opposite brine producing formation 30. In one embodiment, the downhole apparatus employed in the method of this invention includes anchor 72 attached to nozzle 70 by connecting rod or conduit 74. Anchor 72 helps maintain the position of nozzle 70 in well 24 during the injection of the fluoroborate (and acid) down conduit 66. As conduit 66 can be a small diameter coiled tubing extending several thousand feet down well 24 from wellhead 76, in the absence of anchor 72 nozzle 70 may tend to move about undesirably in well 24. Anchor 72 helps maintain nozzle 70 adjacent brine producing formation 30, the location where it is desired to inject the fluoroborate (and acid) into the flow of geothermal brine. Anchor 72 may be positioned anywhere in the vicinity of nozzle 70. Since brine producing formation 30 is sometimes incompetent, it is preferred to position anchor 72 in well 24 below producing formation 30 as shown in the drawing. Anchor 72 can be of any conventional design, for example, an anchor having three or more locking arms 78 which fold up independently as collars, while anchor 72 is being lowered downhole. When the desired depth is reached, conduit 66 is retracted a short distance to set locking arms 78 against the formation. Later, when it is desired to remove nozzle 70 from the well, a stronger upward pull on conduit 66 shears a pin (not shown) in anchor 72 allowing locking arms 78 to collapse and the apparatus to be pulled from well 24. Since the fluoroborate (and acid) exits conduit 66 via nozzle 70, connecting rod or conduit 74 does not transport any fluid. All that is required is that nozzle 70 be firmly attached to anchor 72. This connection is often made using a conduit simply because conduit material is readily available and easy to use, even though it is used for its mechanical strength rather than as a conduit.

Since the portion of conduit 66 extending below wellhead 74 is exposed to the high temperature environment of the geothermal fluid being produced, it is preferred that conduit 66 and nozzle 70 be made of corrosion resistant metal, e.g., stainless steel, Hastelloy, Inconel, or the like.

While the fluoroborate (and acid) can be injected from source 60 downhole at producing formation 30 so as to lower the pH of the brine as close as practical to its origin, brine pH usually increases further as it passes through power plant 10, for example, as non-condensable gases are removed at separators 12 and 14 and the brine is flashed in vessel 16. Thus, it is often desirable to inject the fluoroborate (and acid) into the brine flow in places where substantial portions of silicon-containing precipitates and/or significant pH increases otherwise occur. By so doing, a more uniform brine modification may be achieved or the amount of silicon-complexing and/or acidizing of the brine may be varied according to the amount required at various locations.

To this end, fluoroborate (and acid) may, for example, in addition to or rather than being injected downhole, be injected into brine conduit 32 between wellhead 76 and first separator 12 via conduit 80 containing valve 82; into brine conduit 40 between first and second separators 12 and 14 via conduit 84 containing valve 86; into brine conduit 44 between second separator 14 and flash vessel 16 via conduit 88 containing valve 90; and/or into conduit 58 just upstream of injection well 26 and/or into conduit 59 just upstream of a binary fluid system 110 (shown more specifically in FIG. 2) via conduit 92 containing valve 94. The used brine in conduit 118 from the binary fluid system 110 can also be injected with the fluoroborate (and acid) via conduit 96 containing valve 98. Conduits 80, 84, 88, 92 and 96 can each be connected to fluoroborate (and acid) source 60 (connections not shown).

FIG. 2 shows a schematic of a binary fluid process 110 wherein a scale-control additive containing fluoroborate species is injected into a high-enthalpy geothermal fluid source from a geothermal reservoir or from an industrial geothermal processing source. The high-enthalpy geothermal fluid is supplied to heat-exchanger 112 from such geothermal sources as a producing geothermal well, a flashing vessel or a separator from a flash-condensing process such as that shown in FIG. 1. The feed geothermal fluid may be a single phase liquid or gas stream, but may also be the two phase brine and steam fluid mixture. The heat is extracted from the geothermal fluid at heat-exchanger 112, shown schematically as a counterflow heat-exchanger, but cross-flow or other types of heat-exchangers may be used. After heat is transferred to a binary or working fluid which reaches a maximum temperature $T_1$, the cooled brine is injected into a rejection well 26 (i.e, reinjection well).

The feed geothermal fluid is typically supplied at elevated temperature $T_{B1}$ and pressure conditions from its source via conduit 59 (as in FIG. 1). The feed geothermal fluid may be pumped into the binary heat-exchanger 112 (such as by pump 56 in FIG. 1), but if the production or extraction well is self-flowing, pumping may not be required. Heat-exchanger feed fluid temperature $T_{B1}$ typically ranges from 180° to 300° C., preferably at least 120° C., and most preferably at least 175° C. Feed fluid pressure typically ranges from 896 kPa to 6984 kPa (130 to 1000 psig), preferably no less than 69 kPa (10 psig), and most preferably no less than 793 kPa (115 psig). Heat-exchanger fluid outlet temperature $T_{B2}$ typically ranges from 75° C. to 151° C.

Total change in fluid or brine temperature across the heat-exchanger 112 ($T_{B1}-T_{B2}$, or delta $T_B$) for high-enthalpy brines typically ranges from 30° C. to 225° C., but preferably a delta $T_B$ of at least 100° C. is desired to economically use the high-enthalpy fluids. The non-condensable gas concentration in the feed fluid is theoretically unlimited, but fluids having a non-condensible gas content of at least 0.1 percent by weight and especially those feed fluids having a non-condensible gas content of more than 1.0 percent by weight are typically more efficiently utilized.

The binary or working fluid on the other side of the heat-exchanger surface of heat-exchanger 112 flows in a closed loop. From an initial temperature $T_1$, the binary fluid is heated (by exchanging heat within heat-exchanger 112) to a temperature $T_2$. The heated binary fluid drives a turbine generator 120, is condensed in a condenser 122 and is finally re-pressurized by a feed pump 124 prior to starting around the closed loop again.

The location of fluoroborate addition and mixing with the geothermal fluid is shown at conduit 113 near the entry to heat-exchanger 112, but may also be placed at other locations such as after heat transfer in conduit 118 (via conduit 96 containing value 98). Another possible location is downhole at the production well, similar to that shown on FIG. 1. Control of the amount of fluoroborate species mixed with the geothermal fluid is provided by control valve (or metering pump) 114, which is controlled by sensor 115. Sensor 115 may detect dissolved cations and anions and/or pH of the mixture. The sensor produces a control signal to control valve 114 based upon these measured parameters. Other control parameters and locations for the sensor 115 are also possible.

The preferred process steps for using the fouling-control fluoroborate (and acid) addition apparatus require the cations, silicon-containing components and pH of the feed fluid to be estimated or measured at feed fluid temperature and pressure conditions (e.g., at $T_{B1}$). Because of these elevated conditions and ongoing reactions, measurements may require the use of on-line measurement devices or sampling followed by stabilization and measurement. The feed fluid pH typically is in the range of from 5.5 to 8.5 units, preferably in the range of from 6.0 to 8.0 units, and most preferably in the range of from 6.5 to 7.5 units. One of the advantages of the present invention is the increase in effectiveness of fluoroborate species for maintaining the silicon-containing components of the brine in dissolved or non-precipitated forms as the pH of the brine (in the above-mentioned ranges) increases during various processing steps.

The concentration of silicon-containing components and silicon component-reactable cation(s) in the feed brine may be directly measured or estimated based upon the predominant cation species, such as calcium and barium. These cations are typically found in high-enthalpy brines as silicon-containing precipitate. In addition to Ba and Ca, other cations can react to form precipitates when exposed to silicon-containing anions, e.g., iron, aluminum, strontium, radium, silver and lead. One can also measure the total concentration of other anions in order to estimate potential formation of non-silicon-containing precipitates.

The amount of silicon, including silicon-containing salts, in the feed fluid often exceeds saturation levels at process conditions. Estimated silicon concentrations can be more than 105 percent of saturation amounts at feed brine conditions and/or more than 110 percent of saturation amounts at discharge brine conditions.

If measurement of calcium cations are used in place of total silicon measurements, measured calcium concentrations should be less than 100 ppmw, most preferably less than 60 ppmw in high-enthalpy feed geothermal brines at a temperature of approximately 177° C. (350° F.), such as found at Bulalo. If measurement of barium cations are used in place of total silicon measurements, measured barium concentrations should be less than 15 ppmw, most preferably less than 10 ppmw in high-enthalpy feed geothermal brines at a temperature of approximately 177° C. (350° F.), such as found at Bulalo. The total of calcium and barium cations in the feed brine should be less than 250 ppmw, most preferably less than 145 ppmw if total cation measurements are used in place of total silicon measurements.

The heat-exchanger 112 can be of various designs, the preferred being a shell-and-tube heat-exchanger. Prior use of this type of heat-exchanger for low-enthalpy geothermal fluids places the geothermal fluid on the tube side, so that fouling deposits can be more easily cleaned out, for example with traveling plugs or steam lances. Although flowing brine on the tube side is preferred, treated geothermal fluids can now be used on the shell side of this type of heat-exchanger because of the essential elimination of scale and fouling deposits. The heat-exchanger can be composed of a low alloy steel or other conventional materials.

The binary or working fluid is preferably a hydrocarbon fluid, such as isobutane or an isobutane mixture. The binary fluid can be selected to optimize cycle efficiency at brine inlet $T_{B1}$ and brine outlet $T_{B2}$ conditions.

The means for introducing the fluoroborate species (and acid) to the brine flow can also vary. The preferred embodiment is an additive metering pump (114), controlled by a sensor and measuring device (115), such as pH measurements of the downstream brine/acid mixture, where pH has a generally known or assumed relationship to the content of silicon components. However, control of the amount of fluoroborate (or acid) may also be based upon the measured amounts of other anions in combination with the silicon components in the brine flow. These measured values, along with temperature and other data, can be used to calculate saturation concentrations of brine silicon-containing components (at brine conditions from inlet to heat-exchanger discharge) and the otherwise expected amount of other anionic precipitation. The fluoroborate injection pump rate can then be selected to mix a rate of fluoroborate that will be sufficient to react with a majority of the silicon components (and other precipitable ions) in the brine flow to form complexes without exceeding saturation amounts of the silicon or lowering the pH to less than about 4.5 to 5.5 units.

Heat-exchanger fouling rates, after fluoroborate treatment in accordance with the invention, will be acceptable, i.e., compatible with conventional binary heat-exchange process equipment, for some high-enthalpy brines. The fluoroborate species appears to simultaneously lower pH (dissolving or controlling some scaling tendencies) and also supply tetrafluoroborate anions to inhibit scale forming materials such as silica or other silicon-containing precipitates (e.g., iron and aluminum), but in amounts which avoid calcium component supersaturation and undue corrosion. (The precipitation of calcium fluoride can foul the processing equipment.) As in the earlier-described condensing-flash process, other acidifying agents can be added with the fluoroborate, such as sulfuric, hydrochloric, acetic, and nitric acids, with sulfuric and hydrochloric acids being preferred.

The invention satisfies the need to essentially eliminate scaling and significant fouling in silicon-containing high-enthalpy brines without drastic reductions in pH (and associated corrosion problems). A single addition of fluoroborate species slightly lowers the pH of the mixture and provides anions which apparently complex with the silicon-containing components of the brine at these lowered pH values (usually above 4.0). The invention allows both flash-condensing equipment (separators, flashing vessels, etc.) and binary heat-exchangers comprising commonly available materials to be used with high-enthalpy brines. This can be especially cost effective for brines having significant amounts of dissolved non-condensable gases which require uneconomic gas removal equipment and operations in a flash-condensing process as discussed hereinbefore.

Although the exact mechanism of inhibiting scale and fouling is unknown and the claims hereinafter set forth are in no way limited by the chemical reactions involved in deposition, it is believed that the fluoroborate species forms a complex with the scale-forming silicon-containing salts or silicas, and the associated moderate decrease in pH further decreases the kinetics of silicon-related precipitation. Scale control is thought to be the direct result of limiting the process to high-enthalpy or high temperature feed brines having nearly (above or below) a saturated concentration of cations and silicon-containing components that will produce a silicon-containing precipitate.

Alternative applications of the invention are also possible. These include: combining binary and flash steps in a single vessel (e.g., placing heat-exchanger tubes near the bottom of a flash vessel, using the flashed brine on the shell side to heat a binary fluid within the tubes); a series of binary heat-exchangers and heat-exchange process steps (e.g., regenerative heating of a binary fluid followed by geothermal brine heating); and the use of several different binary working fluids. Alternative process steps include: agitating or mixing the fluoroborate and brine mixture after fluoroborate addition; treating only a portion of the brine feed (e.g., treating a boundary layer of the brine which is proximate to heat exchange surfaces); controlling the heat-exchanger brine temperature change, delta $T_b$, such that significant silicon and/or other ionic supersaturation is avoided at the brine heat-exchanger outlet; and adding an acid containing an anion which does not precipitate the existing amounts of cations in the brine (e.g., if added acid is required to lower the pH of the mixture but the content of the particular anion of the acid in the brine/fluoroborate mixture is approaching saturated values).

The invention is further described by the following example which is illustrative of a specific mode of practicing the invention and is not intended as limiting the scope of the invention as defined by the appended claims.

EXAMPLE 1

A silicic acid solution having a pH of 7.0 is prepared in an autoclave at 100° C. Any insoluble silica components are filtered and the concentration of dissolved monomeric silica in the solution is approximately 389 ppmw—although the predicted saturated concentration of such a solution at 100° C. is 363 ppmw. Aliquots of the solution are separately treated with 100 ppmw of the following complexing agents: catechol, $C_6H_6O_2$; Nalco commercial boron-based silicate inhibitor; sodium tetrafluoroborate, $NaBF_4$; 18-6 crown ether; 15-5 crown ether; borax, $Na_2B_4O_7$; dextrose, $C_6H_{12}O_6$; and boric acid $H_3BO_3$. The individually-treated aliquots and a blank are then allowed to stand at room temperature (24° C.) for 38 hours, filtered, again sampled for silica concentration, and allowed to stand for 96 hours (i.e., an additional 60 hours), filtered and finally sampled. The results are summarized in Table 1.

TABLE 1

| Complexing Agents | Dissolved Silica, ppmw | | |
|---|---|---|---|
| | 0 hr | 38 hrs | 96 hrs |
| None | 389 | 172 | 168 |
| $C_6H_6O_2$ | 389 | 190 | 192 |
| Nalco-boron-based | 389 | 203 | 174 |
| $NaBF_4$ | 389 | 266 | 224 |
| 18-6 Crown ether | 389 | 219 | 217 |
| 15-5 Crown ether | 389 | 214 | 175 |
| $Na_2B_4O_7$ | 389 | 201 | 174 |
| $C_6H_{12}O_6$ | 389 | 203 | 192 |
| $H_3BO_3$ | 389 | 185 | 182 |

As indicated in Table 1, the sodium tetrafluoroborate complexing agent consistently maintains the highest amount of dissolved silicon components in the silicic acid solution during the extended cooling periods.

EXAMPLE 2

In a manner similar to that in Example 1, aliquots of a supersaturated silicic acid solution (390 ppmw Si, pH 6.5) are treated with silicon-complexing agents—sodium and potassium tetrafluoroborate—and their pH's modified within the 5–7 934 range. The aliquots are filtered, sampled and allowed to stand for 24 hours at room temperature (24° C.), filtered and finally sampled. The results are summarized in Table 2.

TABLE 2

| Complexing Agent | pH | Dissolved Silica, ppmw | |
|---|---|---|---|
| | | 0 hr | 24 hrs |
| None | 5 | 389 | 364 |
| None | 6.5 | 390 | 158 |
| None | 7 | 397 | 152 |
| $NaBF_4$ | 5 | 389 | 363 |
| $NaBF_4$ | 6.1 | 400 | 343 |
| $NaBF_4$ | 7 | 407 | 321 |
| $KBF_4$ | 5 | 395 | 385 |
| $KBF_4$ | 6 | 389 | 328 |
| $KBF_4$ | 7 | 400 | 342 |
| $NH_4HF_2$ | 5.8 | 390 | 278 |

As indicated in Table 2, the tetrafluoroborate-treated silica-containing solutions maintain particularly high concentrations of dissolved silica in the solutions of varying pH. More particularly, as the pH increases in the solution, the effect of the fluoroborate species is unexpectedly superior compared to the untreated samples.

While the preferred embodiment of the invention has been shown and described, and some alternative embodiments and examples also shown and/or described, changes and modifications may be made thereto without departing from the invention. Accordingly, it is intended to embrace within the invention all such changes, modifications and alternative embodiments as fall within the spirit and scope of the appended claims.

What is claimed is:

1. A method for inhibiting the formation of a silicon-containing precipitate from an aqueous brine solution derived from a geothermal reservoir said method comprising:

adding a fluoroborate species to said brine solution comprising a silicon-containing component to inhibit the formation of silicon-containing precipitate at a pH of said brine solution above 4.0, said fluoroborate species comprising tetrafluoroborate, $BF_3OH^-$ and any species in solution comprising boron and fluorine which comprises or is in equilibrium with tetrafluoroborate ions or $BF_3OH^-$.

2. The method of claim 1 wherein said fluoroborate species comprises at least a portion of tetrafluoroborate ion.

3. The method of claim 1 wherein said fluoroborate species is added to said brine solution between a separator used in a geothermal flash-condensing process and a geothermal heat-exchanger.

4. The method of claim 1 wherein said fluoroborate species is added before said brine solution is passed through a geothermal flash-condensing separator.

5. The method of claim 1 wherein said fluoroborate species is added before said brine solution is passed through a geothermal heat-exchanger.

6. The method of claim 1 wherein said fluoroborate species is added prior to said brine solution being reinjected into said geothermal reservoir.

7. The method of claim 1 wherein said brine solution is a geothermal fluid comprising a mixture of brine and steam.

8. The method of claim 1 wherein said brine solution has a pH in the range from about 4.0 to about 7.0.

9. The method of claim 8 wherein said fluoroborate species is added in an amount sufficient to maintain said pH in the range from 4.5 to 5.5.

10. The method of claim 1 wherein said silicon-containing component is selected from the group consisting of silicic acid, oligomers of silicic acid, polymers containing silicic acid monomers, silicates and silicas.

11. The method of claim 1 wherein said fluoroborate species is added to a pressurized portion of said brine solution before the pressure of said pressurized portion is reduced.

12. The method of claim 1 further comprising lowering the pH of said brine solution.

13. The method of claim 1 further comprising flowing a mixture of said fluoroborate species and said brine solution in contact with a solid surface of geothermal processing equipment and wherein said mixture does not produce a substantial amount of said silicon-containing precipitate during or after said flowing.

14. The method of claim 1 wherein the density of a portion of said silicon-containing precipitate is lower than the density of a silicon-containing precipitate produced without the adding of said fluoroborate species to said brine solution.

15. The method of claim 1 further comprising flowing a mixture of said fluoroborate species and said brine solution in contact with the subterranean area immediately around a geothermal fluid reinjection well wherein said mixture does not produce a substantial amount of said silicon-containing precipitate during said flowing.

16. The method of claim 1 wherein said silicon-containing precipitate is selected from the group consisting of magnesium silicate, aluminum silicate and iron silicate.

17. A method for controlling the fouling of a solid, heat exchange surface when exposed to a high-enthalpy geothermal fluid having less than a saturated concentration of silicon-containing components that are capable of producing a silicon-containing precipitate, said method comprising:

adding an amount of a fluoroborate species to said geothermal fluid to produce a fluid mixture, said fluoroborate species comprising tetrafluoroborate, $BF_3OH^-$ and any species in solution comprising boron and fluorine which comprises or is in equilibrium with tetrafluoroborate ions or $BF_3OH^-$; and flowing said fluid mixture in contact with said heat exchange surface at a pH of said fluid mixture above 4.0 wherein the formation of silicon-containing precipitate is inhibited.

18. The method of claim 17 which also comprises:

measuring the concentration of said silicon-containing components dissolved in said geothermal fluid;

estimating the saturated concentration of said silicon-containing components in said geothermal fluid;

measuring the pH of said geothermal fluid; and controlling the added amount of said fluoroborate species to prevent the formation of substantial amounts of said precipitate.

19. The method of claim 16 wherein an acid is added to said geothermal fluid in an amount sufficient to produce a pH of said fluid mixture to within the range from 4.5 to 5.5.

20. The method of claim 19 wherein said acid is selected from the group consisting of inorganic mineral acids, organic carboxylic acids, and mixtures thereof.

21. The method of claim 20 wherein said acid is selected from the group consisting of sulfuric acid, hydrochloric acid, acetic acid, nitric acid, and combinations thereof.

22. The method of claim 18 further comprising the step of flashing a portion of said fluid mixture before additional fluoroborate species is added to the remaining liquid portion flowing in contact with said heat-exchange surface.

23. The method of claim 22 wherein said high-enthalpy geothermal fluid is at a pressure which maintains at least one non-condensible gas comprising $CO_2$ and/or $H_2S$ generally dissolved in said geothermal fluid and said geothermal fluid comprises at least 1.0 percent by weight of said non-condensible gases.

24. The method of claim 18 wherein said fluoroborate species forms a soluble complex with said silicon-containing components and said added amount is controlled so as to not substantially increase the corrosion rate of devices in contact with said fluid mixture.

25. The method of claim 17 further comprising transferring thermal energy from said fluid mixture across said heat exchange surface to another fluid.

26. The method of claim 25 further comprising the step of injecting said fluid mixture into a subsurface reservoir after said thermal energy transfer step.

27. The method of claim 17 wherein said fluid mixture comprises a mixture of:

a high-enthalpy geothermal fluid containing substantially less than a saturated amount of silicon-containing compounds; and tetrafluoroborate ions in an amount sufficient to prevent the formation of said silicon-containing precipitate.

28. The method of claim 17 wherein said geothermal brine comprises water, silicon tending to form a silicon-containing scale, at least 0.1 percent by weight of one or more non-condensible gases, and one or more cations capable of (a) reacting with silicon-containing anions and (b) forming a silicon-containing precipitate.

29. The method of claim 17 wherein said silicon-containing component is selected from the group consisting of silicic acid, oligomers of silicic acid, polymers containing silicic acid monomers, silicates and silicas.

30. The method of claim 17 wherein said silicon-containing precipitate is selected from the group consisting of magnesium silicate, aluminum silicate and iron silicate.

31. A method for inhibiting the precipitation of silicon-containing scale from a hot pressurized geothermal fluid having a pH from about 4.0 to about 6.0 and dissolved silicon-containing components capable of forming a silicon-containing precipitate when sufficient thermal energy is removed from said geothermal fluid, said method comprises the following steps:

(1) flashing said geothermal fluid to produce steam and an aqueous liquid brine solution containing said dissolved silicon-containing components;

(2) contacting said aqueous liquid brine solution with a source of tetrafluoroborate ions to form a fluid mixture containing soluble silicon-containing components;

(3) flowing said fluid mixture in contact with a surface of a geothermal heat-exchanger to reduce the temperature of said fluid mixture; and (4) flowing said fluid mixture obtained from step (3) without forming a substantial amount of said precipitate prior to contact with a solid surface contained in a subterranean reservoir.

32. The method of claim 31 wherein said source of tetrafluoroborate ions is selected from the group consisting of sodium tetrafluoroborate, potassium tetrafluoroborate, and ammonium tetrafluoroborate.

33. The method of claim 32 further comprising adding acid to said geothermal fluid and/or to said aqueous liquid brine solution.

34. The method of claim 33 wherein a source of tetrafluoroborate ions is added to said geothermal fluid prior to or during step (1).

35. The method of claim 34 wherein said dissolved silicon-containing components are selected from the group consisting of silicic acid, oligomers of silicic acid, polymers of silicic acid monomers, and silica.

36. The method of claim 35 wherein said acid is selected from the group consisting of sulfuric acid, hydrochloric acid, nitric acid, acetic acid and mixtures thereof.

37. The method of claim 31 wherein said silicon-containing precipitate is selected from the group consisting of magnesium silicate, aluminum silicate and iron silicate.

* * * * *

UNITED STATES PATENT AND TRADEMARK OFFICE
CERTIFICATE OF CORRECTION

PATENT NO.  : 5,665,242
DATED       : September 9, 1997
INVENTOR(S) : Darrell L. Gallup It is certified that error appears in the above-indentified patent and that said Letters Patent is hereby corrected as shown below:

Claim 1, column 13, line 64, after reservoir insert -- , --; column 14, line 3, after tetrafluoroborate delete "." and insert -- , --; line 6, replace "$BE_3OH^-$" with -- $BF_3OH^-$ --.

Claim 19, column 15, line 17, replace "16" with -- 18 --.

Signed and Sealed this

Seventh Day of July, 1998

Attest:

BRUCE LEHMAN

*Attesting Officer*  *Commissioner of Patents and Trademarks*